United States Patent
Stuck

(10) Patent No.: US 10,958,299 B2
(45) Date of Patent: Mar. 23, 2021

(54) REDUCING ANTENNA MULTIPATH AND RAYLEIGH FADING

(71) Applicant: The Boeing Company, Chicago, IL (US)

(72) Inventor: Gary David Stuck, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/905,648

(22) Filed: Feb. 26, 2018

(65) Prior Publication Data

US 2019/0268032 A1    Aug. 29, 2019

(51) Int. Cl.
  *H04B 1/10*  (2006.01)
  *H04B 1/08*  (2006.01)
  *H01Q 1/52*  (2006.01)

(52) U.S. Cl.
  CPC .......... *H04B 1/1081* (2013.01); *H01Q 1/52* (2013.01); *H04B 1/082* (2013.01)

(58) Field of Classification Search
  CPC ......... H04B 1/1081; H04B 1/082; H01Q 1/52
  USPC ........................................ 455/271
  See application file for complete search history.

(56) References Cited

U.S. PATENT DOCUMENTS

| | | | | |
|---|---|---|---|---|
| 6,661,388 | B2 * | 12/2003 | Desargant | H01Q 1/28 343/705 |
| 9,711,843 | B2 * | 7/2017 | Rogers | H01Q 1/243 |
| 9,991,578 | B2 * | 6/2018 | Rogers | H01Q 17/00 |
| 10,209,344 | B2 * | 2/2019 | Dougherty | G01S 7/023 |
| 10,361,489 | B2 * | 7/2019 | Britz | H01Q 15/16 |
| 2004/0110469 | A1 * | 6/2004 | Judd | G01S 19/25 455/15 |
| 2005/0225474 | A1 * | 10/2005 | Steingass | H01Q 1/286 342/4 |
| 2006/0202883 | A1 * | 9/2006 | Treen | H01Q 17/00 342/1 |
| 2013/0069813 | A1 * | 3/2013 | Vangen | H01Q 17/00 342/1 |

(Continued)

OTHER PUBLICATIONS

Euro Technologies, "Microwave Absorbing Materials," 2004, pp. 1-24, LAIRD Technologies, [retrieved on Feb. 22, 2018]. Retrieved from the Internet: <URL: http://www.mouser.com/catalog/specsheets/Laird_4024.pdf>.

(Continued)

*Primary Examiner* — Sonny Trinh
(74) *Attorney, Agent, or Firm* — Haynes and Boone LLP

(57) ABSTRACT

Systems, methods, and apparatus for reducing antenna multipath and Rayleigh fading are disclosed. In one or more embodiments, a disclosed method for reducing multipath and Rayleigh fading for an antenna comprises receiving, by a structure, at least one undesired electromagnetic (EM) signal. In one or more embodiments, the structure is mounted proximate the antenna. In at least one embodiment, the structure comprises absorber material and/or reflective material. In one or more embodiments, the antenna is mounted on top of the structure. In at least one embodiment, the structure further comprises a core, where the core is covered by the absorber material and/or the reflective material. In at least one embodiment, the core is in the shape of a sphere, a hemisphere, at least a portion of a sphere, an ellipsoid, a torus, a pyramid, a cube, a cuboid, a cylinder, a cone, a polyhedron, or a freeform shape.

20 Claims, 16 Drawing Sheets

(56) References Cited

U.S. PATENT DOCUMENTS

| | | | | |
|---|---|---|---|---|
| 2015/0288073 | A1* | 10/2015 | Hall | H01Q 3/26 |
| | | | | 342/2 |
| 2017/0125915 | A1* | 5/2017 | Lebayon | H01Q 17/008 |
| 2017/0373384 | A1* | 12/2017 | MacNeille | H01Q 1/3275 |
| 2018/0219285 | A1* | 8/2018 | Dabrowski | H01Q 17/001 |

OTHER PUBLICATIONS

Emerson, William H., "ECCOSORB Principles," Excerpts from *Electromagnetic Wave Absorbers, Useful Tools for Engineers*, 1984, pp. 1-6 [online], [retrieved on Feb. 22, 2018]. Retrieved from the Internet: <URL: http://www.eccosorb.com/notes-eccosorb-principles.htm>.

Panashield, "RF Absorber Materials," 2018, pp. 1-4 [online], Panashield LLC, [retrieved on Feb. 22, 2018]. Retrieved from the Internet: <URL: http://www.panashield.com/emc_absorbers.asp>.

* cited by examiner

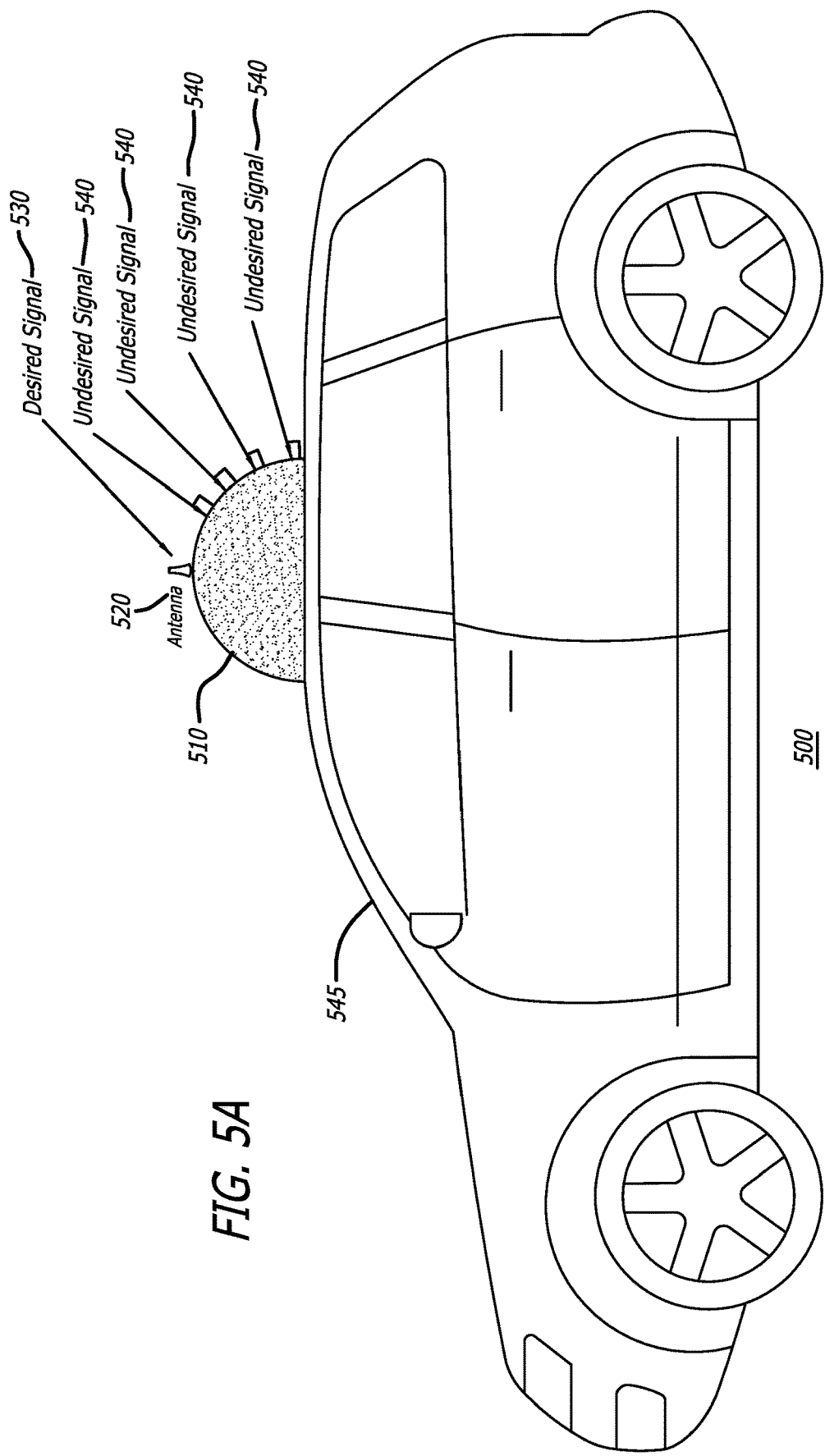

REDUCING ANTENNA MULTIPATH AND RAYLEIGH FADING

FIELD

The present disclosure relates to antenna multipath and Rayleigh fading. In particular, it relates to reducing antenna multipath and Rayleigh fading.

BACKGROUND

Receive antennas, both terrestrial and in space, commonly experience multipath and Rayleigh fading. Multipath is a propagation phenomenon that results from undesired signals reaching a receive antenna by two or more paths. Causes of multipath include, but are not limited to, atmospheric ducting, ionospheric reflection and refraction, and reflection from bodies of water and objects, such as buildings, mountains, structures, and the ground. Multipath causes multipath interference (including constructive and destructive interference) and phase shifting of the desired signal. Destructive interference, in particular, causes signal fading, where magnitudes of the undesired signals have a distribution known as a Rayleigh distribution, which is commonly referred to as Rayleigh fading.

Currently, to combat multipath and Rayleigh fading, expensive and complicated solutions are implemented, such as diversity techniques, channel coding, and equalization techniques. There is therefore a need for an improved technique for reducing antenna multipath and Rayleigh fading that is cost effective and easy to implement.

SUMMARY

The present disclosure relates to a method, system, and apparatus for reducing antenna multipath and Rayleigh fading. In one or more embodiments, a method for reducing multipath and Rayleigh fading comprises receiving, by a structure, at least one undesired electromagnetic (EM) signal. In one or more embodiments, the structure is mounted proximate the antenna. In at least one embodiment, the structure comprises absorber material and/or reflective material.

In one or more embodiments, the antenna is airborne, terrestrial, or marine. In some embodiments, the antenna is a receive antenna, or a transmit and receive antenna.

In at least one embodiment, the antenna is mounted on top of the structure. In some embodiments, at least a portion of the structure surrounds at least a portion of the antenna.

In one or more embodiments, the structure further comprises a core, where the core is covered by the absorber material and/or the reflective material. In some embodiments, the core comprises a shape of a sphere, a hemisphere, at least a portion of a sphere, an ellipsoid, a torus, a pyramid, a cube, a cuboid, a cylinder, a cone, a polyhedron, and/or a freeform shape.

In at least one embodiment, the absorber material comprises carbon, metal, metal particles, polypyrrole, and/or polyaniline. In some embodiments, the absorber material comprises pyramidal absorber, tapered loading absorber, and/or matching layer absorber. In at least one embodiment, the absorber material absorbs radio frequency (RF) signals.

In one or more embodiments, the structure is mounted on a vehicle. In at least one embodiment, the vehicle is an airborne vehicle, a terrestrial vehicle, or a marine vehicle.

In at least one embodiment, a system for reducing multipath and Rayleigh fading for an antenna comprises the antenna and a structure to receive at least one undesired electromagnetic (EM) signal. In one or more embodiments, the structure is mounted proximate the antenna. In at least one embodiment, the structure comprises absorber material and/or reflective material.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 3A is a diagram showing a structure in the shape of a sphere, in accordance with at least one embodiment of the present disclosure.

FIG. 3B is a diagram showing a structure in the shape of an ellipsoid, in accordance with at least one embodiment of the present disclosure.

FIG. 3C is a diagram showing a structure in shape comprising an ellipsoid on a freeform shape, in accordance with at least one embodiment of the present disclosure.

FIG. 3D is a diagram showing a structure in the shape of a four-sided pyramid, in accordance with at least one embodiment of the present disclosure.

FIG. 3E is a diagram showing a structure in a shape comprising a cuboid on a torus, in accordance with at least one embodiment of the present disclosure.

FIG. 3F is a diagram showing a structure comprising a three-dimensional (3D) freeform shape, in accordance with at least one embodiment of the present disclosure.

FIG. 3G is a diagram showing a structure in the shape of a polyhedron, in accordance with at least one embodiment of the present disclosure.

FIG. 3H is a diagram showing a structure in the shape of a hemisphere, in accordance with at least one embodiment of the present disclosure.

FIG. 3I is a diagram showing a structure in the shape of a three-sided pyramid, in accordance with at least one embodiment of the present disclosure.

FIG. 3J is a diagram showing a structure in the shape of a 3D diamond, in accordance with at least one embodiment of the present disclosure.

FIG. 3K is a diagram showing a structure in a shape comprising a hemisphere on a sphere, in accordance with at least one embodiment of the present disclosure.

FIG. 3L is a diagram showing a structure in a shape comprising a hemisphere on a cuboid, in accordance with at least one embodiment of the present disclosure.

FIG. 4A is a diagram showing a structure in the shape of a 3D diamond mounted on a pole stand, in accordance with at least one embodiment of the present disclosure.

FIG. 4B is a diagram showing a structure in the shape of a pyramid mounted on a pole stand, in accordance with at least one embodiment of the present disclosure.

FIG. 4C is a diagram showing a structure in the shape of a polyhedron mounted on a pole stand, in accordance with at least one embodiment of the present disclosure.

FIGS. 5A and 5B are diagrams showing structures mounted on different types of vehicles that may be employed for the disclosed system for reducing multipath and Rayleigh fading for an antenna, in accordance with at least one embodiment of the present disclosure.

FIG. 5A is a diagram showing a structure in the shape of a hemisphere mounted on a car, in accordance with at least one embodiment of the present disclosure.

FIG. 5B is a diagram showing multiple structures that are each in the shape of a hemisphere and mounted on an airplane, in accordance with at least one embodiment of the present disclosure.

FIG. 6A is a diagram showing a side view of exemplary pyramidal absorber material that may be employed for the structure of the disclosed system for reducing multipath and Rayleigh fading for an antenna, in accordance with at least one embodiment of the present disclosure.

FIG. 6B is a diagram showing a side view of exemplary tapered loading absorber material that may be employed for the structure of the disclosed system for reducing multipath and Rayleigh fading for an antenna, in accordance with at least one embodiment of the present disclosure.

FIG. 6C is a diagram showing a side view of exemplary matched absorber material that may be employed for the structure of the disclosed system for reducing multipath and Rayleigh fading for an antenna, in accordance with at least one embodiment of the present disclosure.

FIG. 8A is a diagram showing an exemplary dipole antenna that may be employed for the antenna for the disclosed system for reducing multipath and Rayleigh fading for an antenna, in accordance with at least one embodiment of the present disclosure.

FIG. 8B is a diagram showing an exemplary bowtie antenna that may be employed for the antenna for the disclosed system for reducing multipath and Rayleigh fading for an antenna, in accordance with at least one embodiment of the present disclosure.

FIG. 8C is a diagram showing an exemplary monopole antenna that may be employed for the antenna for the disclosed system for reducing multipath and Rayleigh fading for an antenna, in accordance with at least one embodiment of the present disclosure.

FIG. 8D is a diagram showing an exemplary inductor loaded monopole antenna that may be employed for the antenna for the disclosed system for reducing multipath and Rayleigh fading for an antenna, in accordance with at least one embodiment of the present disclosure.

FIG. 8E is a diagram showing an exemplary pyramidal horn antenna that may be employed for the antenna for the disclosed system for reducing multipath and Rayleigh fading for an antenna, in accordance with at least one embodiment of the present disclosure.

FIG. 8F is a diagram showing an exemplary tower antenna that may be employed for the antenna for the disclosed system for reducing multipath and Rayleigh fading for an antenna, in accordance with at least one embodiment of the present disclosure.

FIG. 8G is a diagram showing an exemplary parabolic reflector antenna that may be employed for the antenna for the disclosed system for reducing multipath and Rayleigh fading for an antenna, in accordance with at least one embodiment of the present disclosure.

FIG. 8H is a diagram showing an exemplary omni-directional antenna that may be employed for the antenna for the disclosed system for reducing multipath and Rayleigh fading for an antenna, in accordance with at least one embodiment of the present disclosure.

FIG. 8I is a diagram showing an exemplary Yagi-Uda antenna that may be employed for the antenna for the disclosed system for reducing multipath and Rayleigh fading for an antenna, in accordance with at least one embodiment of the present disclosure.

DESCRIPTION

Figure 1:
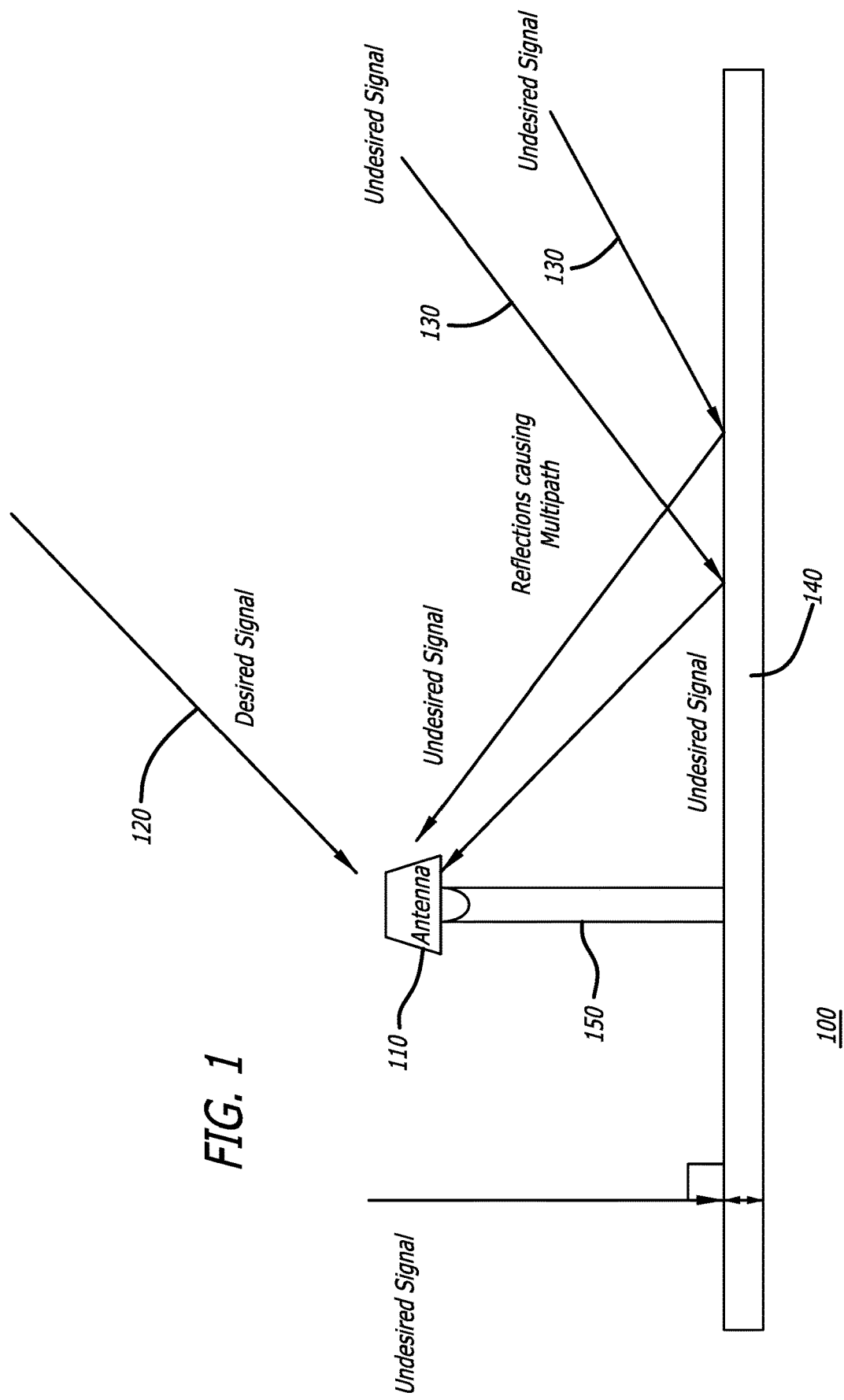
FIG. 1 is a diagram showing an exemplary antenna experiencing multipath.

The methods and apparatus disclosed herein provide an operative system for reducing antenna multipath and Rayleigh fading. The disclosed system employs a structure, comprising radio frequency (RF) absorber material and/or reflective material, mounted proximate to a receive antenna to absorb and/or reflect any undesired RF signals. The structure is shaped and mounted proximate the antenna such that at least a portion of the surface of the structure is normal to incoming undesired multipath signals. This causes the undesired multipath signals to be attenuated within the absorber material with any remaining signals reflected back towards the source of the signals and not the receiving antenna, and/or to be reflected back to the source by the reflective material.

As previously mentioned above, receive antennas, both terrestrial and in space, commonly experience multipath and Rayleigh fading. Multipath is a propagation phenomenon that results from undesired signals reaching a receiving antenna by two or more paths. Causes of multipath may include atmospheric ducting, ionospheric reflection and refraction, and reflection from bodies of water and objects, such as buildings, mountains, structures, and the ground. Multipath causes multipath interference (including constructive and destructive interference) and phase shifting of the desired signal. Destructive interference, in particular, causes signal fading, where magnitudes of the undesired signals have a distribution known as a Rayleigh distribution, referred to as Rayleigh fading. Currently, to combat multipath and Rayleigh fading, expensive and complicated solutions are implemented, such as diversity techniques (e.g., antenna diversity by utilizing multiple antennas, spatial diversity amongst antennas, antenna polarization diversity, frequency diversity, and time diversity), channel coding (e.g., to correct for multipath), and equalization techniques (e.g., to combat intersymbol interference (ISI) created by multipath).

The disclosed system employs a structure that comprises the combination of a uniquely shaped core covered with RF absorber material and/or reflective material that can be applied to satellite and/or ground systems to solve the widely-experienced communication channel problem of multipath and Rayleigh fading. The disclosed structure can be applied to any receive antenna and any communication system to reduce and minimize multipath and Rayleigh fading. In particular, for the disclosed structure, RF absorber material and/or reflective material is mounted on a shaped surface (e.g., a core) such that at least a portion of the surface of the structure is normal to the incoming undesired signals. This allows for undesired multipath signals to be attenuated within the absorber material with any small remaining signals to be reflected back towards the source and not the receiving antenna, and/or reflected back to the source by the reflective material. The covered surface is shaped to be normal to the incoming undesired multipath signals and is located in the nearby vicinity of the receive antenna. The shape can be spherical or any other geometrical shape based on the surface of the structure being perpendicular/normal to the incoming undesired RF signals. In one or more embodiments, the structure is placed below and around the receive antenna, where the significant small-scale multipath signals are prevalent.

The surface of the absorber material and/or the reflective material is shaped to be at normal incidence to the incoming undesired multipath signals to minimize multipath. This is because the attenuation and/or reflection of the RF signals is maximized for high angles of incidence (i.e. when the angle of incidence of the incoming wave is perpendicular or normal to the RF absorbing material, the absorption is maximized and the reflection minimized; and when the angle of incidence of the incoming wave is perpendicular or normal to the reflective material, the reflection is maximized). As such, this lends itself to employing a spherical shape or hemispherical shape for the structure for satellite and ground systems where the signals are visible from horizon to horizon. The absorber material will attenuate the undesired multipath signals until some small fraction of the incident waves will be reflected back from the absorber material, and any remaining reflecting signals are reflected directly back towards the direction of the source so that the receiving antenna does not see any multipath interference.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to antenna systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing an exemplary antenna 110 experiencing multipath. In this figure, an antenna 110 is shown to be mounted on a pole stand 150 that is standing on the ground 140. The antenna 110, in FIG. 1, is an omnidirectional antenna. However, it should be noted that various different types of antennas may be employed for the antenna 110 rather than an omnidirectional antenna as is shown in FIG. 1.

In particular, in FIG. 1, the antenna 110 is shown to be receiving a desired signal 120 that is transmitted from a source (not shown). In addition, the antenna 110 is shown to be experiencing multipath from undesired signals 130. In this example of multipath, the undesired signals 130 are transmitted from the source (not shown), and are reflected off of the ground 140 prior to be received by the antenna 110. The undesired signals 130 can cause multipath interference, which can include constructive and destructive interference, and phase shifting of the desired signal 120.

Figure 2A:
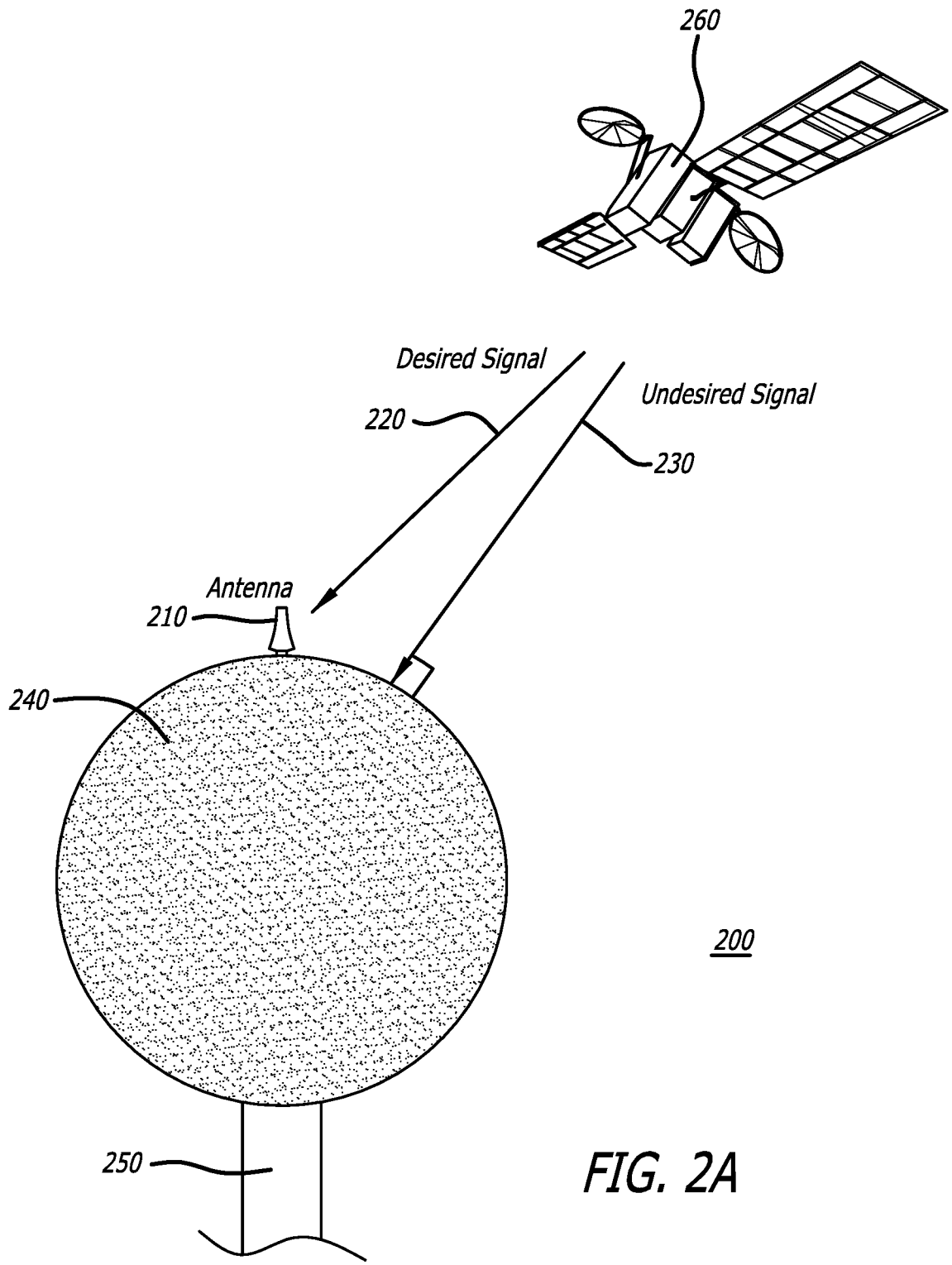
FIG. 2A is a diagram showing the disclosed system for reducing multipath and Rayleigh fading for an antenna that employs an antenna, which is mounted on a structure in the shape of a sphere that is mounted on a pole stand, receiving signals from a satellite, in accordance with at least one embodiment of the present disclosure.
Figure 5B:
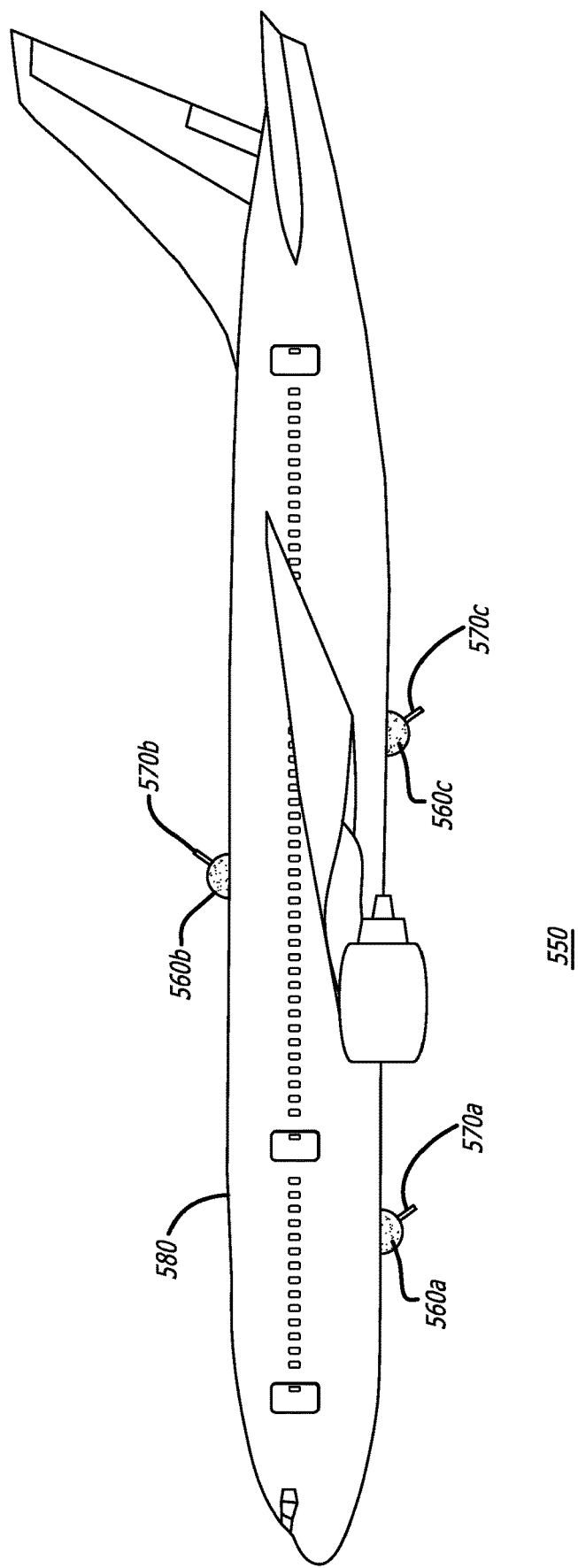

FIG. 2A is a diagram 200 showing the disclosed system for reducing multipath and Rayleigh fading for an antenna that employs an antenna 210, which is mounted on a structure 240 in the shape of a sphere that is mounted on a pole stand 250, receiving signals from a satellite 260, in accordance with at least one embodiment of the present disclosure. In this figure, the antenna 210 is shown to be mounted on top of the structure 240 that is mounted on the pole stand 250, which is mounted or standing on the ground. In other embodiments, the structure 240 may be mounted directly on the ground, on a building, or on a vehicle. FIGS. 5A and 5B, for example, show structures mounted on different types of vehicles that may be employed for the disclosed system. It should be noted that, in one or more embodiments, the structure 240 and antenna 210 are mounted in an outside environment (i.e. not in a test chamber).

In FIG. 2A, the antenna 210 is a receive antenna. Alternatively, the antenna 210 may be a dual receive and transmit antenna. The antenna 210, in FIG. 2A, is an omnidirectional antenna. In other embodiments, various different types of antennas may be employed for the antenna 210 of the disclosed system rather than an omnidirectional antenna as is shown in FIG. 2A. For example, FIGS. 8A-8I show some examples various different types of antennas that may be employed for the antenna 210 of the disclosed system.

The structure 240, in FIG. 2A, is in the shape of a sphere. However, in other embodiments of the disclosed system, the structure 240 may be in the form of various different geometrical or freeform three-dimensional (3D) shapes. For example, FIGS. 3A-3L show some examples of various different shapes that may be employed for the structure 240 of the disclosed system. The structure 240 comprises a core (refer to 295 of FIG. 2C) covered by material (refer to 292 of FIG. 2C), which may comprise absorber material and/or reflective material. It should be noted that, in some embodiments, the structure 240 may comprise absorber material, may comprise reflective material, or may be a hybrid structure that comprises both absorber material on some areas of the structure 240 and reflective material on other areas of the structure 240. The absorber material is capable of absorbing electromagnetic (EM) signals, and particularly radio frequency (RF) signals; and the reflective material is capable of reflecting electromagnetic (EM) signals, and particularly radio frequency (RF) signals.

In FIG. 2A, the antenna 210 is shown to be receiving a desired signal 220 that is transmitted from a source 260. The source 260, in FIG. 2A, is shown to be a satellite. However, in other embodiments, various different types of sources may be utilized for the source 260 including, but not limited to, ground antennas (e.g., ground stations or cellular towers) or antennas mounted on vehicles (e.g., airborne vehicles, terrestrial vehicles, or marine vehicles). In addition, an undesired signal 230 is shown to have originated from the source 260. If the structure 240 employs absorber material, the absorber material of the structure 240 receives and absorbs the undesired signal 230 so that the antenna 210 does not experience multipath. And, if the structure 240 employs reflective material, the reflective material of the structure 240 reflects the undesired signal 230 away from the antenna 210 (ideally reflects the undesired signal 230 back towards the source 260) so that the antenna 210 does not experience multipath.

The shape of the structure 240, as well as the mounting position of the antenna 210 in relation to the structure 240, is chosen such that the surface of the structure 240 is (as much as possible) at normal incidence to incoming undesired signals 230. This helps to minimize the multipath experienced by the antenna 210 because the attenuation and/or reflection of the undesired signals 230 is maximized for high angles of incidence (i.e. when the angle of incidence of the incoming wave is perpendicular or normal to the surface of the absorber material, the absorption of the undesired signals 230 is maximized and the reflection is minimized; and when the angle of incidence of the incoming wave is perpendicular or normal to the surface of the reflective material, the reflection of the undesired signals 230 is maximized).

Figure 2B:
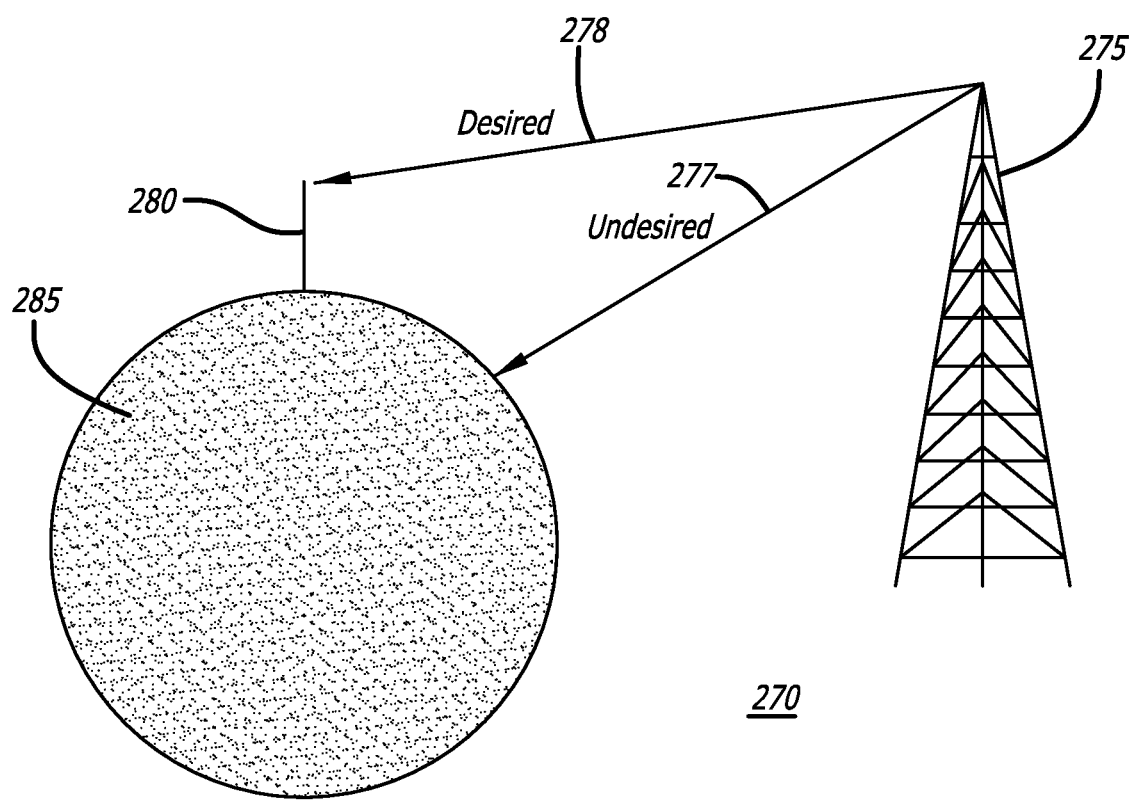
FIG. 2B is a diagram showing the disclosed system for reducing multipath and Rayleigh fading for an antenna that employs an antenna, which is mounted on a structure in the shape of a sphere, receiving signals from a cellular tower, in accordance with at least one embodiment of the present disclosure.

FIG. 2B is a diagram 270 showing the disclosed system for reducing multipath and Rayleigh fading for an antenna that employs an antenna 280, which is mounted on a structure 285 in the shape of a sphere, receiving signals from a cellular tower 275, in accordance with at least one embodiment of the present disclosure. This figure shows a monopole antenna 280 mounted on a structure 285 in the shape of a sphere. The antenna 280 is shown to be receiving a desired signal 278 transmitted from a source 275, which is a cellular tower. The structure 285 comprises a core (refer to 295 of FIG. 2C) covered by material (refer to 292 of FIG. 2C), which may comprise absorber material and/or reflective material. If the structure 285 is employs absorber material, the absorber material of the structure 285 receives and absorbs the undesired signal 277, which originated from the source 275, so that the antenna 280 does not experience multipath. And, if the structure 285 is employs reflective material, the reflective material of the structure 285 receives and reflects the undesired signal 277, which originated from the source 275, so that the antenna 280 does not experience multipath.

Figure 2C:
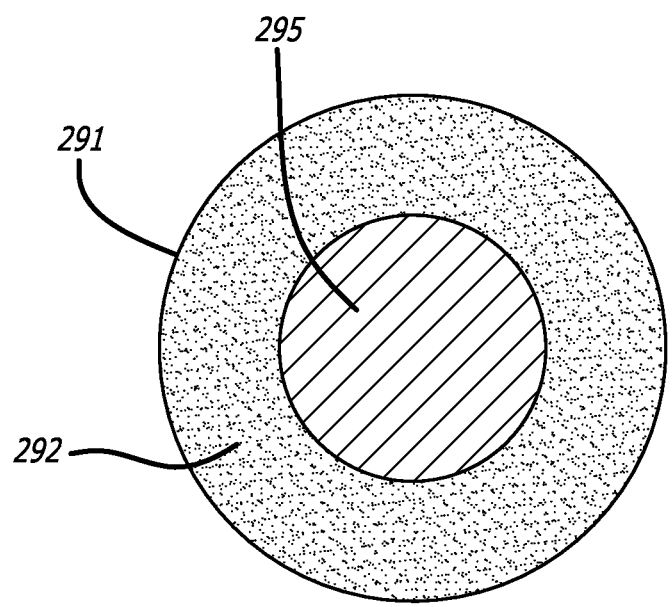
FIG. 2C is a diagram showing a cross-sectional view of an exemplary structure employed by the disclosed system for reducing multipath and Rayleigh fading for an antenna that employs an antenna, in accordance with at least one embodiment of the present disclosure.

FIG. 2C is a diagram 290 showing a cross-sectional view of an exemplary structure 291 employed by the disclosed system for reducing multipath and Rayleigh fading for an antenna that employs an antenna, in accordance with at least one embodiment of the present disclosure. In this figure, the structure 291 is in the shape of a sphere, and is shown to comprise a core 295 covered by material 292. The underside of the material 292 is bonded to the exterior surface of the core 295 by a bond. It should be noted that the material 292 may comprise absorber material and/or reflective material.

The core 295, in FIG. 2C, is in the shape of a sphere. However, in other embodiments, the core 295 may be of various different three-dimensional (3D) geometrical or freeform shapes other than a sphere including, but not limited to, a hemisphere, at least a portion of a sphere, an ellipsoid, a torus, a three-sided pyramid, a four-sided pyramid, a cube, a cuboid, a cylinder, a cone, a polyhedron, a freeform shape, or a combination thereof. The core 295 may be manufactured from various different materials including, but not limited to, natural materials (e.g., wood and/or metals) and/or synthetic materials (e.g., plastics and/or polymers).

If the material 292 comprises absorber material, the absorber material is electromagnetic (EM) absorber material that absorbs EM radiation. In one or more embodiments, the absorber material is radio frequency (RF) absorber material that absorbs RF signals. The absorber material may be manufactured from various different materials including, but not limited to, carbon (e.g., coating mats of animal hair mixed with carbon black), metal (e.g., iron oxide), metal particles (aluminum metal particles and/or powered iron), polypyrrole (which may be employed with latex, polymer blends, and/or fibers), polyaniline (i.e. a conducting polymer), and a combination thereof. In addition, various different forms of absorber material may be utilized for the material 292 including, but not limited to, pyramidal absorber (refer to FIG. 6A), tapered loading absorber (FIG. 6B), and matching layer absorber (FIG. 6C).

If the material 292 comprises reflective material, the reflective material reflects EM radiation. The reflective material may be manufactured from various different materials including, but not limited to, metals, graphite, composite materials, and a combination thereof.

FIG. 3A-3L are diagrams showing various different shapes that may be employed for the structure of the disclosed system for reducing multipath and Rayleigh fading for an antenna, in accordance with at least one embodiment of the present disclosure. It should be noted that the different shapes shown in FIGS. 3A-3L are only some of the various different geometrical and freeform shapes that may be utilized for the structure of the disclosed system. In one or more embodiments, the structure of the disclosed system may be of various different three-dimensional (3D) geometrical or freeform shapes including, but not limited to, a sphere, a hemisphere, at least a portion of a sphere, an ellipsoid, a torus, a three-sided pyramid, a four-sided pyramid, a cube, a cuboid, a cylinder, a cone, a polyhedron, a freeform shape, or a combination thereof. In addition, in this figures, it should be noted that the antennas mounted on the various different structures are all monopole antennas. However, in other embodiments of the disclosed system, various different types of antennas may be employed instead of a monopole antenna, as is depicted in these figures. For example, FIGS. 8A-8I show some examples various different types of antennas that may be employed for the disclosed system. Additionally, it should be noted that the antenna may be mounted on the structure such that at least a portion of the structure surrounds at least a portion of the antenna.

Figure 3A:
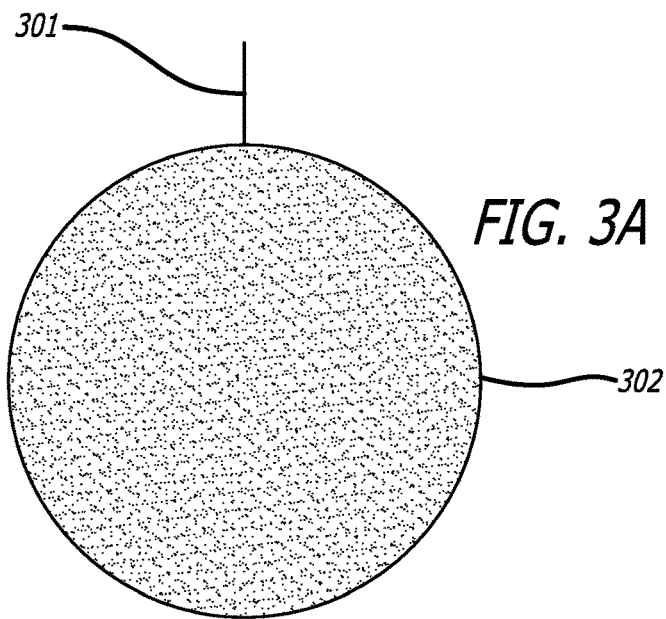
FIG. 3A-3L are diagrams showing various different shapes that may be employed for the structure of the disclosed system for reducing multipath and Rayleigh fading for an antenna, in accordance with at least one embodiment of the present disclosure.
Figure 3B:
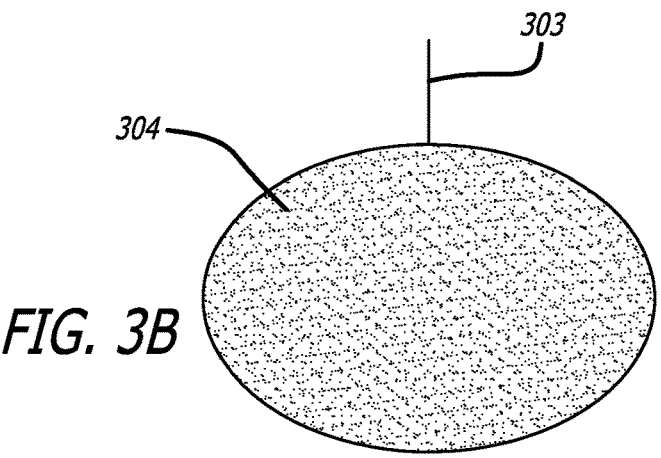
Figure 3C:
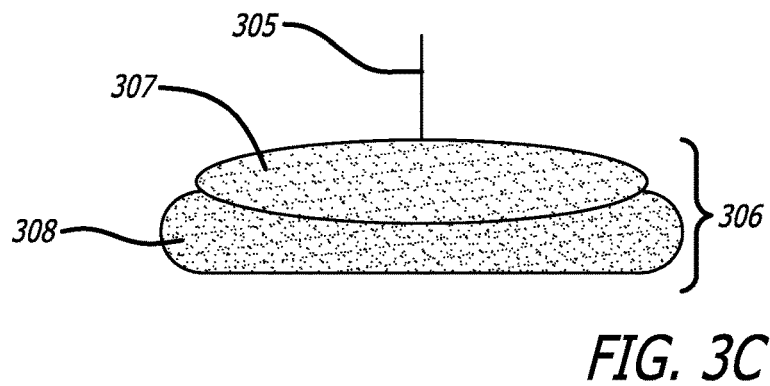
Figure 3D:
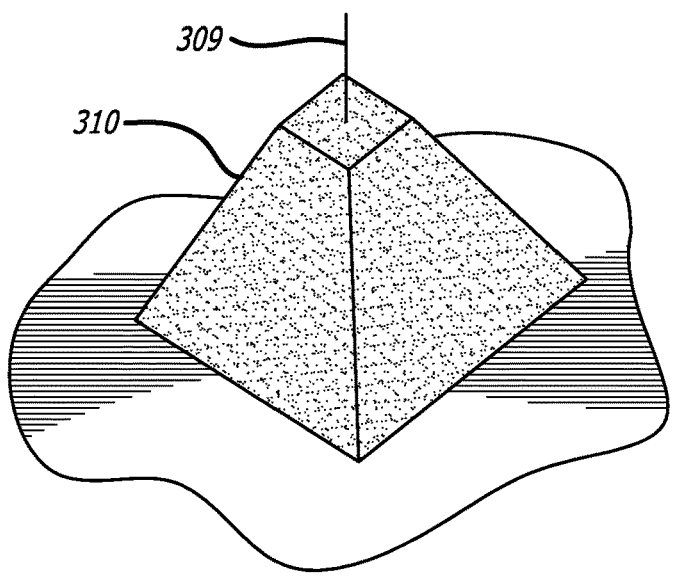

FIG. 3A is a diagram showing a structure 302 in the shape of a sphere, in accordance with at least one embodiment of the present disclosure. In this figure, a monopole antenna 301 is shown to be mounted on the spherical structure 302. FIG. 3B is a diagram showing a structure 304 in the shape of an ellipsoid, in accordance with at least one embodiment of the present disclosure. In this figure, a monopole antenna 303 is shown to be mounted on the structure 304, which is an ellipsoid. FIG. 3C is a diagram showing a structure 306 in shape comprising an ellipsoid 307 on a freeform shape 308, in accordance with at least one embodiment of the present disclosure. A monopole antenna 305 is shown to be mounted on the ellipsoid 307 portion of the structure 306 of FIG. 3C. FIG. 3D is a diagram showing a structure 310 in the shape of a four-sided pyramid, in accordance with at least one embodiment of the present disclosure. In this figure, a monopole antenna 309 is shown to be mounted on the pyramidal structure 310.

Figure 3E:
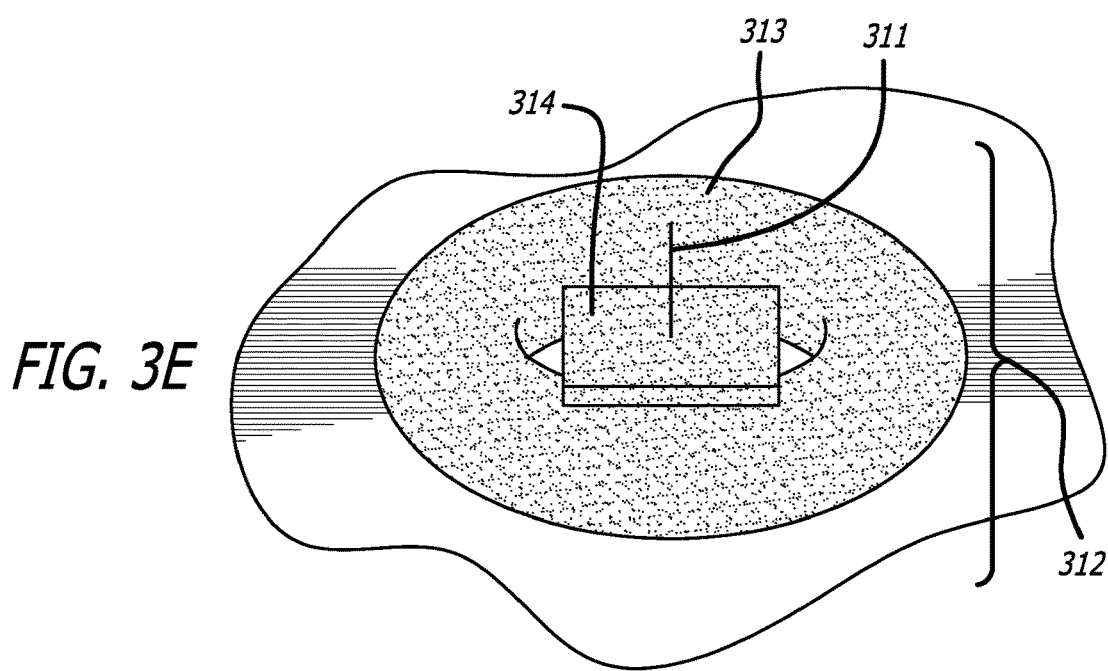
Figure 3F:
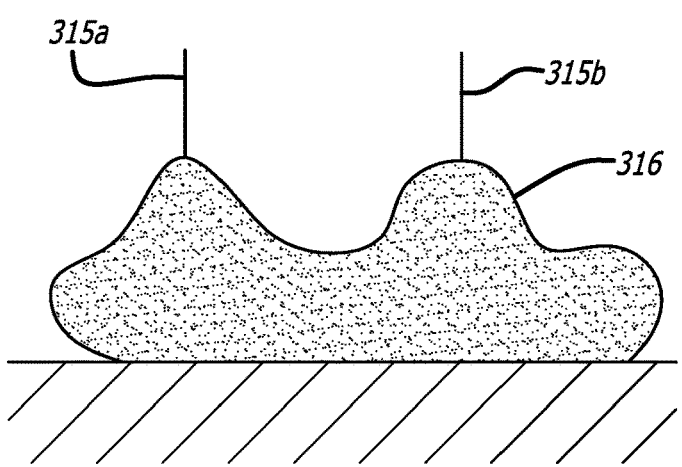

FIG. 3E is a diagram showing a structure 312 in a shape comprising a cuboid 314 on a torus 313, in accordance with at least one embodiment of the present disclosure. A monopole antenna 311 is shown to be mounted on the cuboid 314 portion of the structure 312. FIG. 3F is a diagram showing a structure 316 comprising a three-dimensional (3D) freeform shape, in accordance with at least one embodiment of the present disclosure. In this figure, two monopole antennas 315a, 315b are shown to be mounted at two different locations on peaks of the freeform structure 316.

Figure 3G:
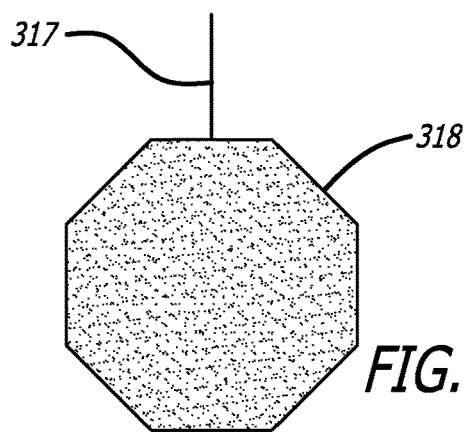
Figure 3H:
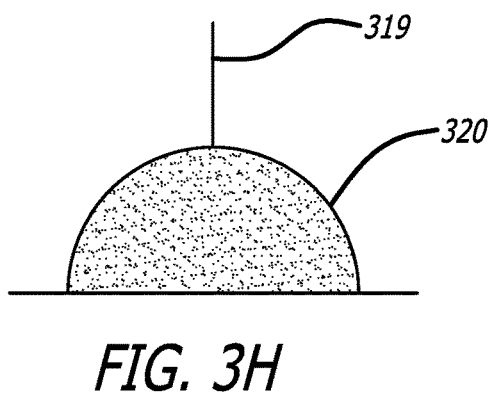

FIG. 3G is a diagram showing a structure 318 in the shape of a polyhedron, in accordance with at least one embodiment of the present disclosure. In this figure, a monopole antenna 317 is shown to be mounted on the structure 318, which is a polyhedron. It should be noted that in other embodiments of the disclosed system, the structure 318 may be in the shape of various different polyhedrons comprising more or less sides than the polyhedron depicted in FIG. 3G. FIG. 3H is a diagram showing a structure 320 in the shape of a hemisphere, in accordance with at least one embodiment of the present disclosure. A monopole antenna 319 is shown to be mounted on the hemispherical structure 320. It should be noted that in some embodiments of the disclosed system, the structure 320 may be in the shape of a portion of a sphere that may comprise less than or more than a hemisphere, as is shown in FIG. 3H.

Figure 3I:
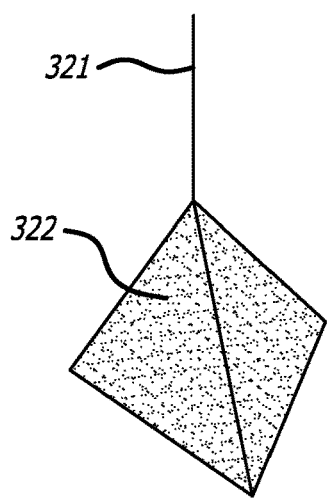
Figure 3J:
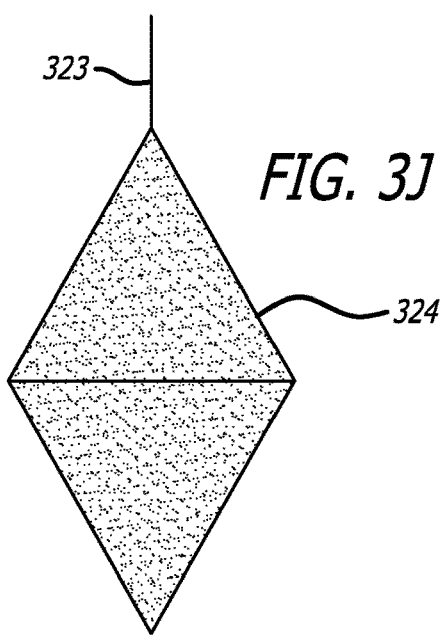

FIG. 3I is a diagram showing a structure 322 in the shape of a three-sided pyramid, in accordance with at least one embodiment of the present disclosure. In this figure, a monopole antenna 321 is shown to be mounted on the pyramidal structure 322. FIG. 3J is a diagram showing a structure 324 in the shape of a 3D diamond, in accordance with at least one embodiment of the present disclosure. In this figure, the monopole antenna 323 is shown to be mounted on a peak of the diamond-shaped structure 324.

Figure 3K:
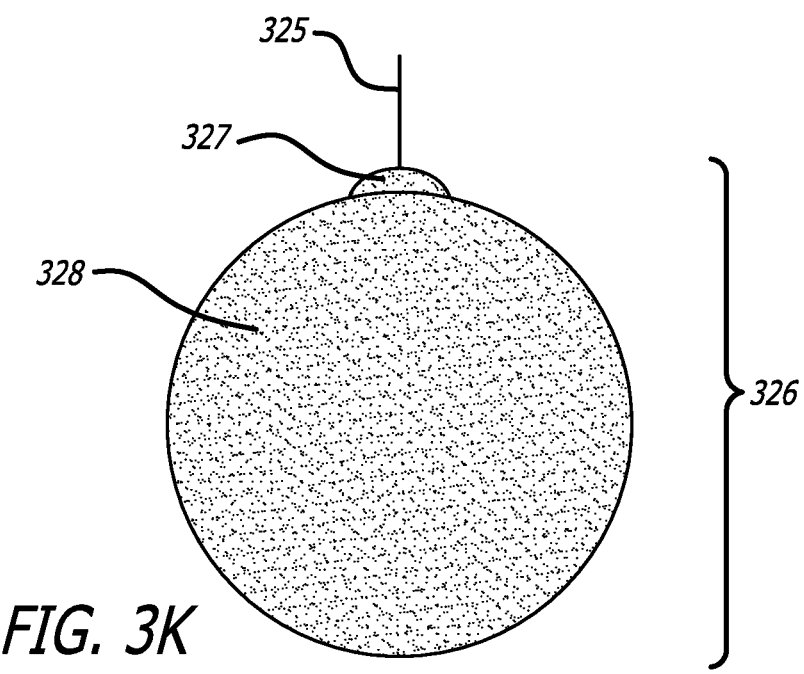
Figure 3L:
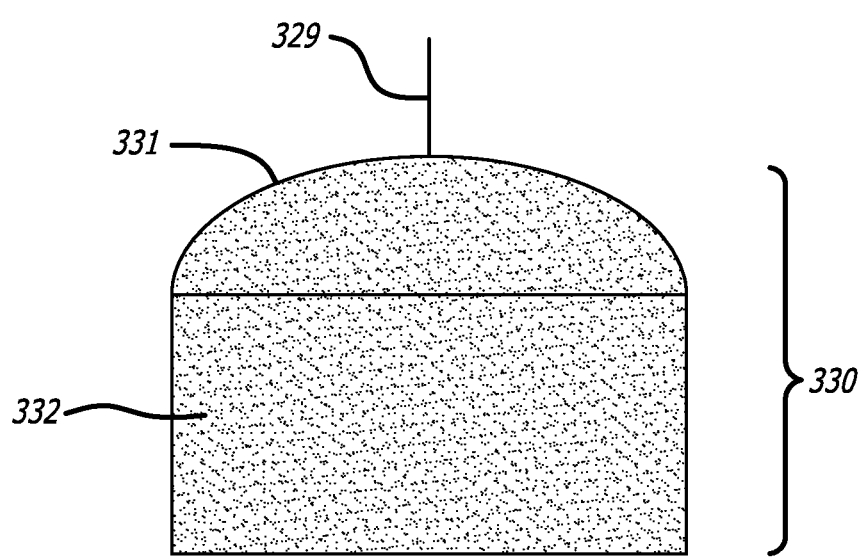

FIG. 3K is a diagram showing a structure 326 in a shape comprising a hemisphere 327 on a sphere 328, in accordance with at least one embodiment of the present disclosure. A monopole antenna 325 is shown to be mounted on the hemisphere 327 portion of the structure 326. FIG. 3L is a diagram showing a structure 330 in a shape comprising a hemisphere 331 on a cuboid 332, in accordance with at least one embodiment of the present disclosure. In this figure, a monopole antenna 329 is shown to be mounted on the hemisphere 331 portion of the structure 330.

Figure 4A:
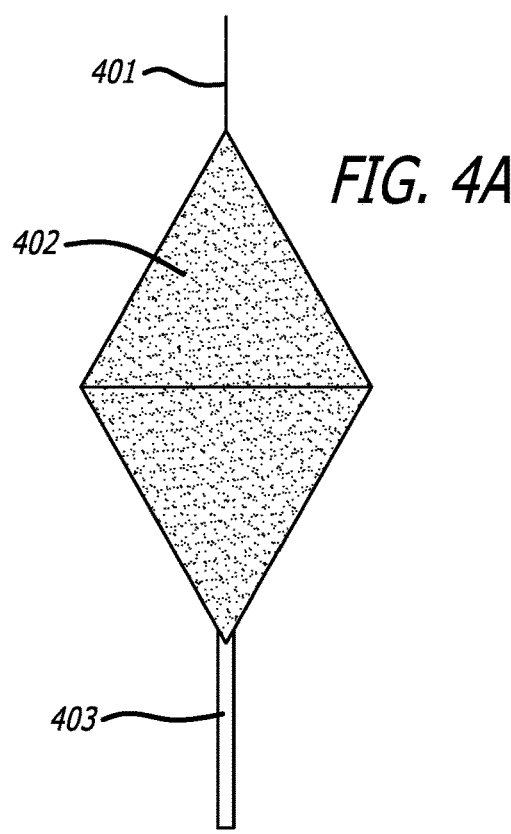
FIGS. 4A-4C are diagrams showing a various different shapes that may be utilized for the structure of the disclosed system for reducing multipath and Rayleigh fading for an antenna, where the structure is mounted on a pole stand, in accordance with at least one embodiment of the present disclosure.
Figure 4B:
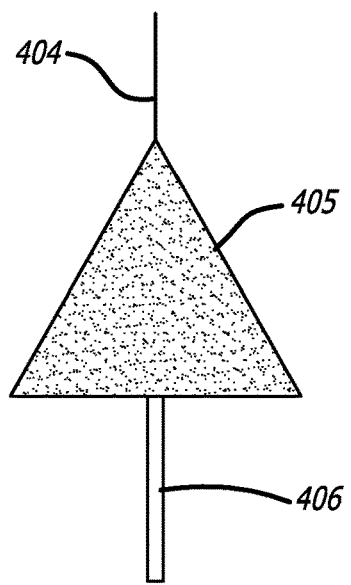
Figure 4C:
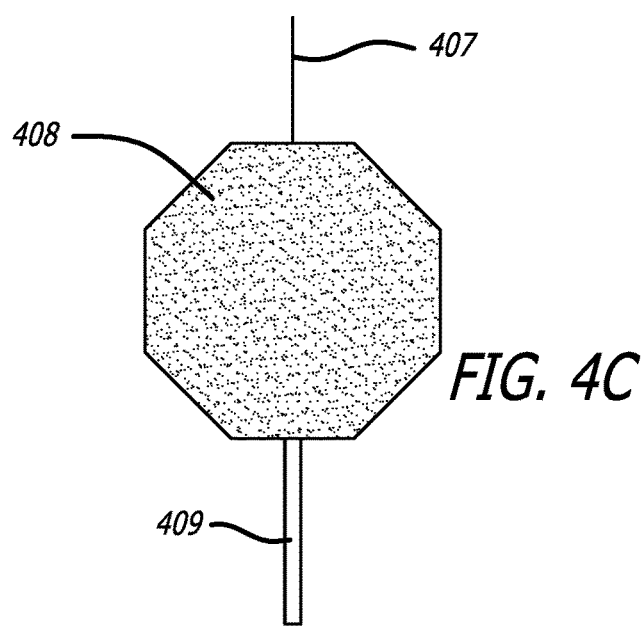

FIGS. 4A-4C are diagrams showing a various different shapes that may be utilized for the structure of the disclosed system for reducing multipath and Rayleigh fading for an antenna, where the structure is mounted on a pole stand, in accordance with at least one embodiment of the present disclosure. It should be noted that, in one or more embodiments, the pole of the pole stand may be manufactured from various different materials including, but not limited to, natural materials (e.g., wood and/or metals) and/or synthetic materials (e.g., plastics and/or polymers). In addition, the structures mounted pole stands may be of various different geometric and freeform shapes other than the few shapes depicted in these figures, and the antennas mounted on the structure may be of various different types of antennas than the monopole antenna shown in these figures.

FIG. 4A is a diagram showing a structure 402 in the shape of a 3D diamond mounted on a pole stand 403, in accordance with at least one embodiment of the present disclosure. In this figure, the monopole antenna 401 is shown to be mounted on a peak of the diamond-shaped structure 402. FIG. 4B is a diagram showing a structure 405 in the shape of a pyramid mounted on a pole stand 406, in accordance with at least one embodiment of the present disclosure. A monopole antenna is shown to be mounted on the pyramidal structure 405. FIG. 4C is a diagram showing a structure 408 in the shape of a polyhedron mounted on a pole stand 409, in accordance with at least one embodiment of the present disclosure.

FIGS. 5A and 5B are diagrams showing structures mounted on different types of vehicles that may be employed for the disclosed system for reducing multipath and Rayleigh fading for an antenna, in accordance with at least one embodiment of the present disclosure. It should be noted that for the disclosed system, the structures may be mounted on various different types of vehicles including, but not limited to, terrestrial vehicles (e.g., cars, trucks, and tanks) where the associated antenna is a terrestrial antenna, airborne vehicles (e.g., airplanes, aircraft, and satellites) where the associated antenna is an airborne antenna, and marine vehicles (e.g., ships and boats) where the associated antenna is a marine antenna. In addition, it should be noted that, in some embodiments, the shape of the structure to be mounted on the vehicle is chosen such that the structure is aerodynamic.

Also, it should be noted that in FIGS. 5A and 5B, the size of the structures in relation to the vehicles is for illustration purposes and can vary widely. As such, the disclosed system may employ structures that are larger or smaller than the structures depicted in FIGS. 5A and 5B in relation to the size of the illustrated vehicles. For example, the disclosed system may employ structures that are smaller in size than the structures shown in these figures in relation to the size of the vehicles so that the structures may be more aerodynamic (e.g., small low drag structures).

FIG. 5A is a diagram 500 showing a structure 510 in the shape of a hemisphere mounted on a car 545, in accordance with at least one embodiment of the present disclosure. In this figure, the structure 510 is mounted on the exterior of the roof of the car 545. The antenna 520 is shown to be mounted on top of a structure 510. The antenna 520, in FIG. 5A, is an omnidirectional antenna. In other embodiments, various different types of antennas may be employed for the antenna 520 of the disclosed system rather than an omnidirectional antenna as is shown in FIG. 5A. The structure 510, in FIG. 5A, is in the shape of a hemisphere. However, in other embodiments of the disclosed system, the structure 240 may be in the form of various different geometrical or freeform three-dimensional (3D) shapes.

In FIG. 5A, the antenna 520 is shown to be receiving a desired signal 530 that is transmitted from a source (not shown). In addition, undesired signals 540 are shown, which have originated from the source (not shown). The absorber material of the structure 510 receives and absorbs the undesired signals 540 so that the antenna 520 does not experience multipath.

FIG. 5B is a diagram showing multiple structures 560a, 560b, 560c that are each in the shape of a hemisphere and mounted on an airplane 580, in accordance with at least one embodiment of the present disclosure. In this figure, the structures 560a, 560b, 560c are mounted at various different locations on the exterior of the airplane 580. A monopole antenna 570a, 570b, 570c is mounted on each of the structures 560a, 560b, 560c, respectively.

Figure 6A:
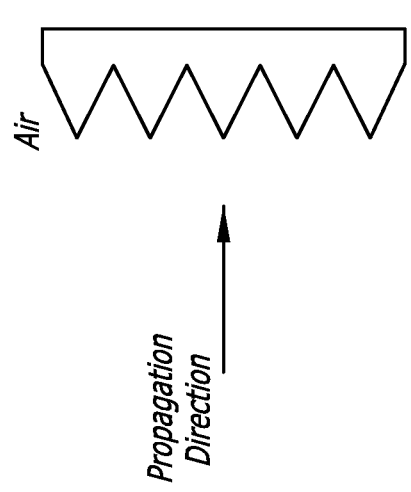
FIGS. 6A-6C are diagrams showing various different types of absorber materials that may be employed for the material of the structure of the disclosed system for reducing multipath and Rayleigh fading for an antenna, in accordance with at least one embodiment of the present disclosure.
Figure 6B:
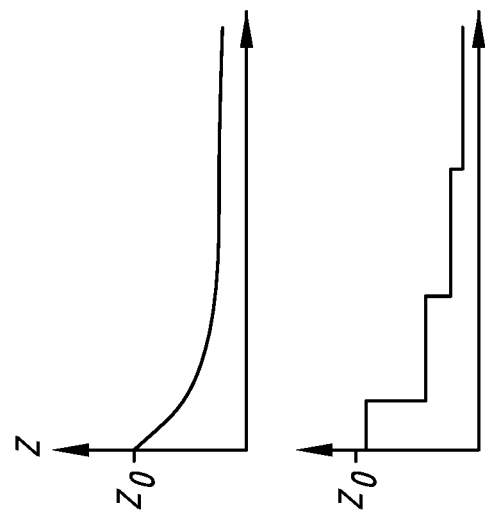
Figure 6C:
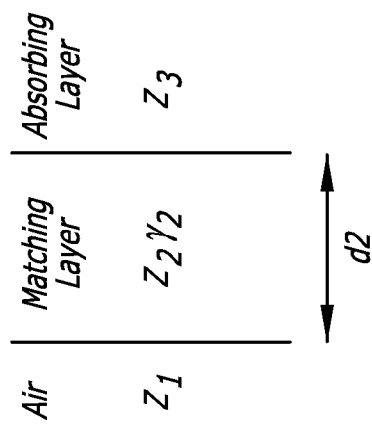

FIGS. 6A-6C are diagrams showing various different types of absorber materials that may be employed for the material of the structure of the disclosed system for reducing multipath and Rayleigh fading for an antenna, in accordance with at least one embodiment of the present disclosure. It should be noted that various different types of absorber material may be employed for the disclosed structure other than the few various different types of absorber material that are shown in these figures.

FIG. 6A is a diagram showing a side view of exemplary pyramidal absorber material that may be employed for the structure of the disclosed system for reducing multipath and Rayleigh fading for an antenna, in accordance with at least one embodiment of the present disclosure. Pyramidal absorber provides a gradual impedance transition from air to the absorber. The shape of pyramidal absorber is a cone-like structure (e.g. refer to FIG. 7A), which is arranged perpendicular to the surface that the pyramidal absorber is bonded (refer to FIG. 7B). The height and periodicity of the pyramidal absorber may be about one wavelength long.

FIG. 6B is a diagram showing a side view of exemplary tapered loading absorber material that may be employed for the structure of the disclosed system for reducing multipath and Rayleigh fading for an antenna, in accordance with at least one embodiment of the present disclosure. Tapered loading absorber has a varied impedance (Z) grading over one or more wavelengths. Tapered loading absorber is advantageous over pyramidal absorber due to its depth being thin in size. A thin depth of absorber material offers poor performance and, as such, with the tapered loading absorber, the impedance gradient is varied over one or more wavelengths to improve its performance. The tapered loading absorber is made from a combination of low loss and lossy materials. The lossy material is dispersed parallel to the surface of the absorber material with its gradient perpendicular to the surface, which increases into the body of the material.

FIG. 6C is a diagram showing a side view of exemplary matched absorber material that may be employed for the structure of the disclosed system for reducing multipath and Rayleigh fading for an antenna, in accordance with at least one embodiment of the present disclosure. Matched absorber material has a thickness (d2) that is thinner than pyramidal absorber material and tapered loading absorber material. Matched absorber material employs an additional matching layer that lies in between air and the absorbing layer. The impedance of this transition layer is between the impedance of air (Z1) and the impedance of the absorbing layer (Z2), where $Z2=(Z1*Z3)*0.5$.

Figure 7A:
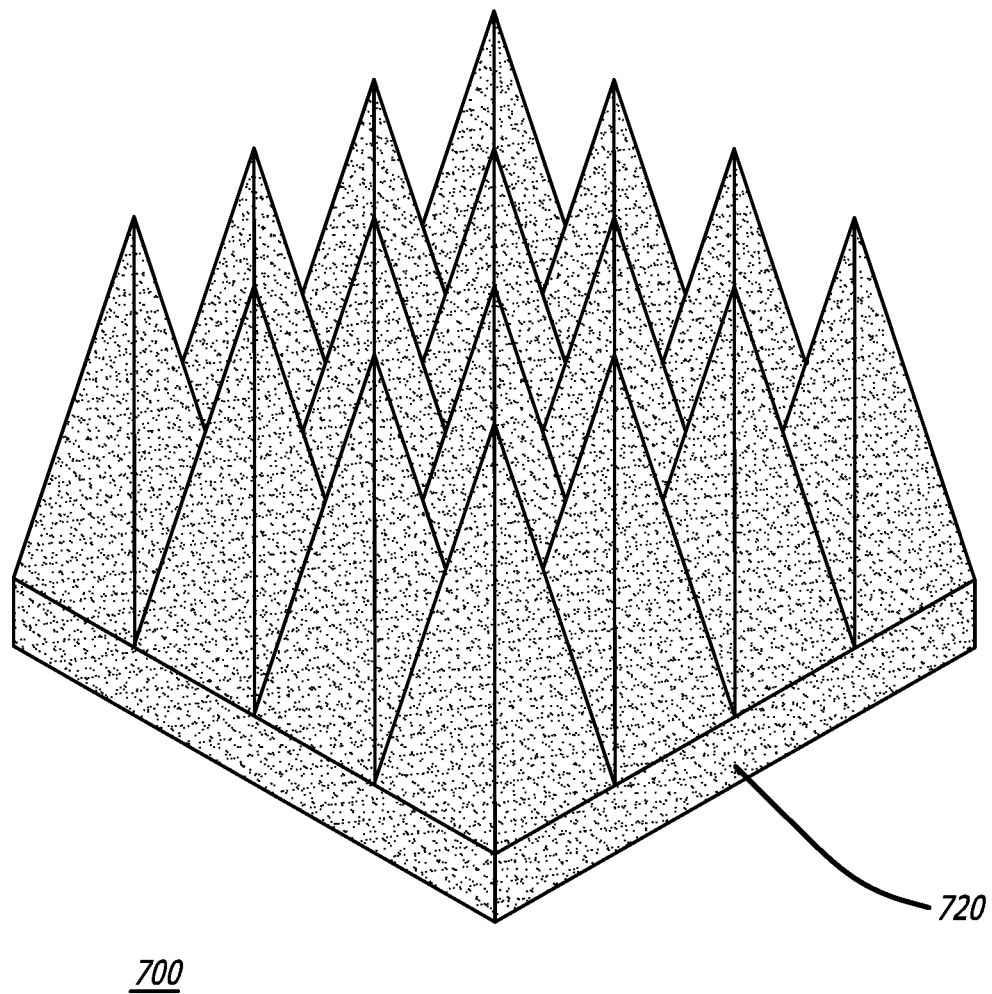
FIG. 7A is a diagram showing a perspective view of exemplary pyramidal absorber material that may be employed for the structure of the disclosed system for reducing multipath and Rayleigh fading for an antenna, in accordance with at least one embodiment of the present disclosure.
Figure 7B:
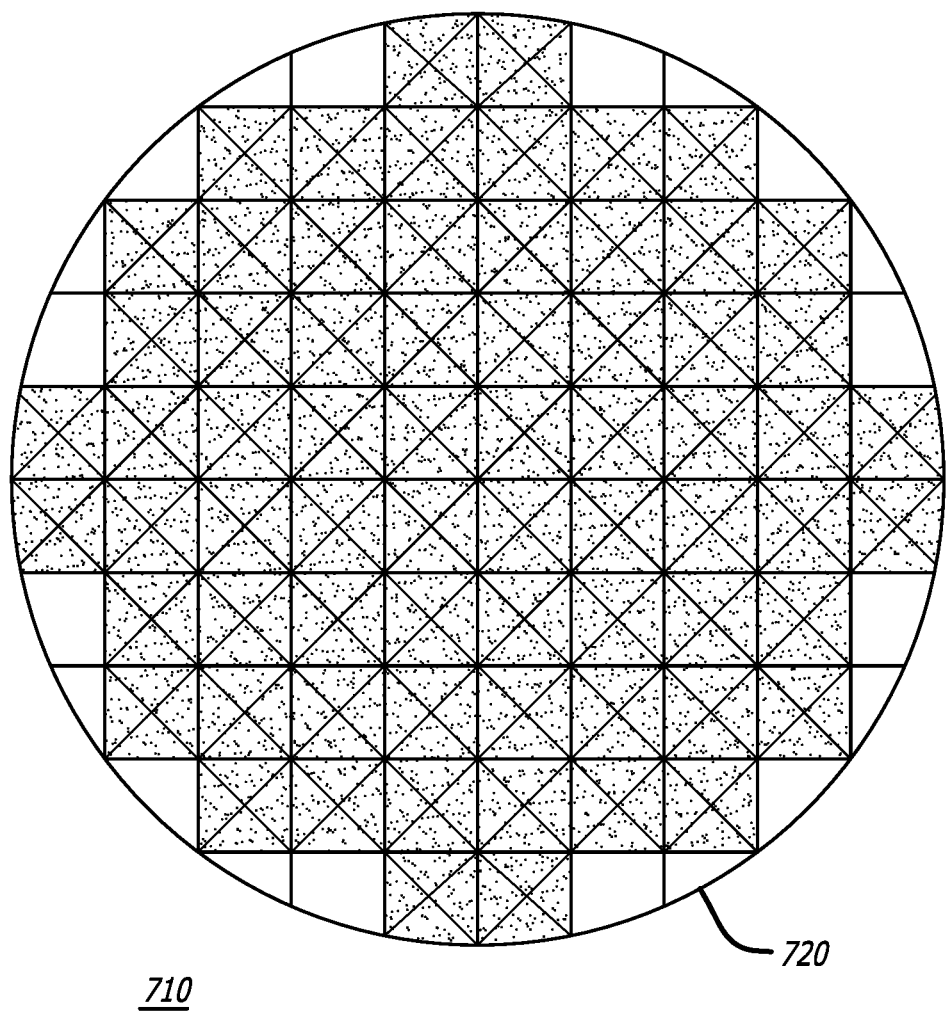
FIG. 7B is a diagram showing an overhead view of exemplary pyramidal absorber material that may be employed for the structure of the disclosed system for reducing multipath and Rayleigh fading for an antenna, in accordance with at least one embodiment of the present disclosure.

FIG. 7A is a diagram 700 showing a perspective view of exemplary pyramidal absorber material 720 that may be employed for the structure of the disclosed system for reducing multipath and Rayleigh fading for an antenna, in accordance with at least one embodiment of the present disclosure. And, FIG. 7B is a diagram 710 showing an overhead view of exemplary pyramidal absorber material 720 that may be employed for the structure of the disclosed system for reducing multipath and Rayleigh fading for an antenna, in accordance with at least one embodiment of the present disclosure.

FIGS. 8A-8I are diagrams showing various different types of antennas that may be employed for the antenna of the disclosed system for reducing multipath and Rayleigh fading for an antenna, in accordance with at least one embodiment of the present disclosure. It should be noted that various different types of antennas may be employed for the disclosed system other than the few various different types of antennas that are shown in these figures.

Figure 8A:
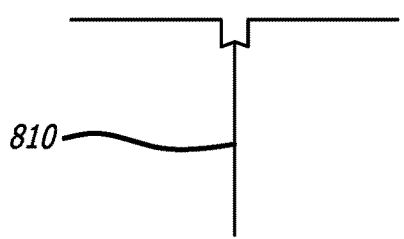
FIGS. 8A-8I are diagrams showing various different types of antennas that may be employed for the antenna of the disclosed system for reducing multipath and Rayleigh fading for an antenna, in accordance with at least one embodiment of the present disclosure.
Figure 8B:
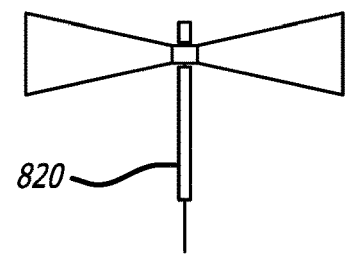
Figure 8C:
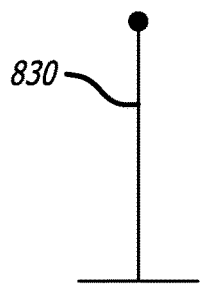
Figure 8D:
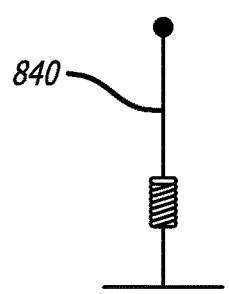

FIG. 8A is a diagram showing an exemplary dipole antenna 810 that may be employed for the antenna for the disclosed system for reducing multipath and Rayleigh fading for an antenna, in accordance with at least one embodiment of the present disclosure. FIG. 8B is a diagram showing an exemplary bowtie antenna 820 that may be employed for the antenna for the disclosed system for reducing multipath and Rayleigh fading for an antenna, in accordance with at least one embodiment of the present disclosure. FIG. 8C is a diagram showing an exemplary monopole antenna 830 that may be employed for the antenna for the disclosed system for reducing multipath and Rayleigh fading for an antenna, in accordance with at least one embodiment of the present disclosure. FIG. 8D is a diagram showing an exemplary inductor loaded monopole antenna 840 that may be employed for the antenna for the disclosed system for reducing multipath and Rayleigh fading for an antenna, in accordance with at least one embodiment of the present disclosure.

Figure 8E:
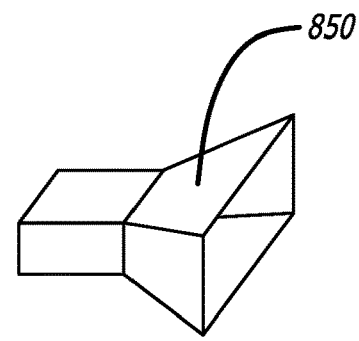

FIG. 8E is a diagram showing an exemplary pyramidal horn antenna 850 that may be employed for the antenna for the disclosed system for reducing multipath and Rayleigh fading for an antenna, in accordance with at least one embodiment of the present disclosure. It should be noted that in some embodiments, different types of horn antennas may be employed by the disclosed system other than a pyramidal horn antenna including, but not limited to, a ring-loaded horn antenna, a step horn antenna, and a trifurcated horn antenna.

Figure 8F:
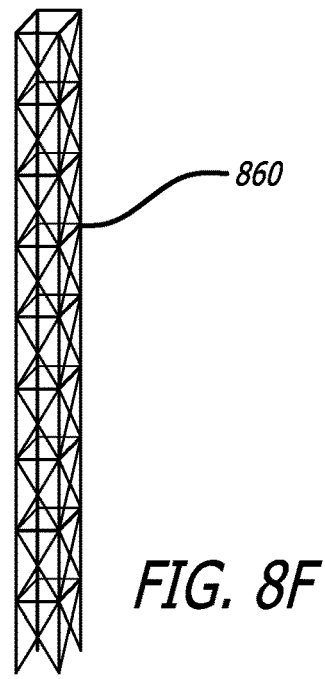

FIG. 8F is a diagram showing an exemplary tower antenna 860 that may be employed for the antenna for the disclosed system for reducing multipath and Rayleigh fading for an antenna, in accordance with at least one embodiment of the present disclosure.

Figure 8G:
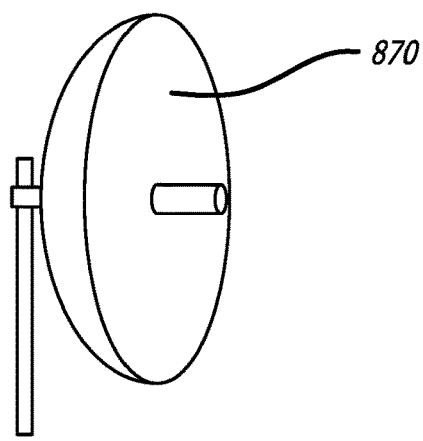

FIG. 8G is a diagram showing an exemplary parabolic reflector antenna 870 that may be employed for the antenna for the disclosed system for reducing multipath and Rayleigh fading for an antenna, in accordance with at least one embodiment of the present disclosure. In some embodiments, different types of reflector antennas may be employed by the disclosed system other than a parabolic reflector antenna including, but not limited to, a shaped reflector antenna and a dual reflector system (e.g., Cassagrain dual reflector system or Gregorian dual reflector system).

Figure 8H:
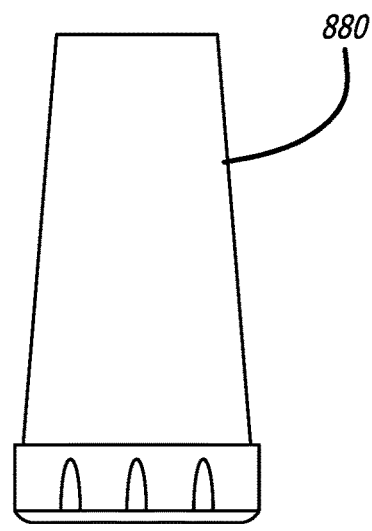
Figure 8I:
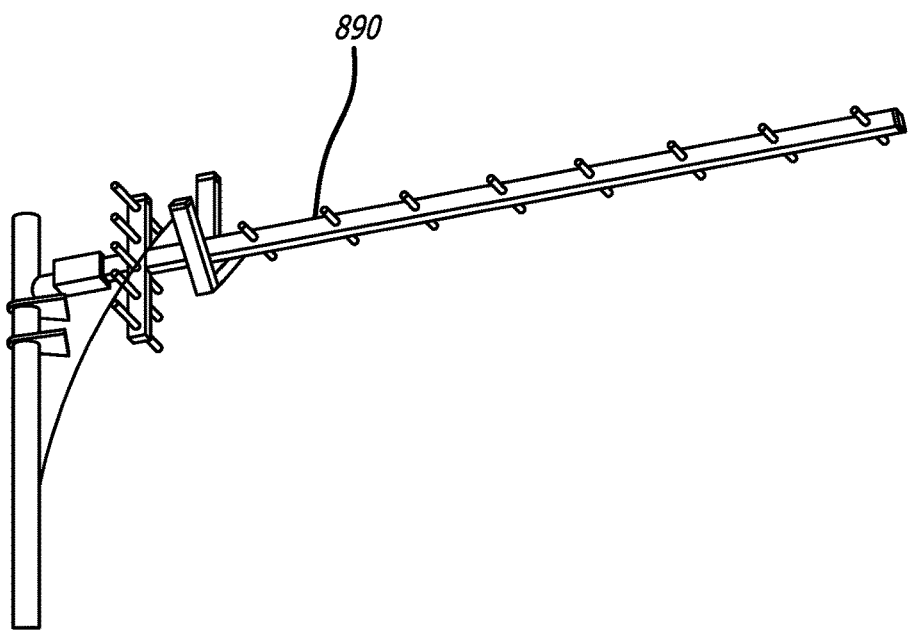

FIG. 8H is a diagram showing an exemplary omnidirectional antenna 880 that may be employed for the antenna for the disclosed system for reducing multipath and Rayleigh fading for an antenna, in accordance with at least one embodiment of the present disclosure. FIG. 8I is a diagram showing an exemplary Yagi-Uda antenna 890 that may be employed for the antenna for the disclosed system for reducing multipath and Rayleigh fading for an antenna, in accordance with at least one embodiment of the present disclosure.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method that reduces multipath and Rayleigh fading for an antenna, the method comprising:
receiving, by a structure, at least one undesired electromagnetic (EM) signal, which is the multipath; and
at least one of absorbing or reflecting, by the structure, the multipath,
wherein the structure is mounted on a vehicle and proximate the antenna, and the structure comprises a core covered by at least one of absorber material or reflective material, and
wherein the absorber material is an EM absorber material that absorbs EM radiation, and the reflective material is an EM reflective material that reflects the EM radiation.

2. The method of claim 1, wherein the antenna is one of airborne, terrestrial, or marine.

3. The method of claim 1, wherein the antenna is one of a receive antenna or a transmit and receive antenna.

4. The method of claim 1, wherein the antenna is mounted on top of the structure.

5. The method of claim 1, wherein at least a portion of the structure surrounds at least a portion of the antenna.

6. The method of claim 1, wherein the core comprises a shape of one of a sphere, a hemisphere, at least a portion of a sphere, a pyramid, a cube, a cuboid, a cylinder, a cone, an ellipsoid, a torus, a polyhedron, a freeform shape, or a combination thereof.

7. The method of claim 1, wherein the absorber material comprises at least one of carbon, metal, metal particles, polypyrrole, or polyaniline.

8. The method of claim 1, wherein the absorber material comprises at least one of pyramidal absorber, tapered loading absorber, or impedance matching layer absorber.

9. The method of claim 1, wherein the absorber material absorbs radio frequency (RF) signals.

10. The method of claim 1, wherein the vehicle is one of an airborne vehicle, a terrestrial vehicle, or a marine vehicle.

11. The method of claim 1, wherein the structure is mounted proximate the antenna such that at least a portion of a surface of the structure is normal to incoming undesired multipath signals.

12. The method of claim 1, wherein the structure is shaped such that at least a portion of a surface of the structure is normal to incoming undesired multipath signals.

13. A system that reduces multipath and Rayleigh fading for an antenna, the system comprising:
the antenna; and
a structure to receive at least one undesired electromagnetic (EM) signal, which is the multipath, and to at least one of absorb or reflect the multipath,
wherein the structure is mounted on a vehicle and proximate the antenna, and the structure comprises a core covered by at least one of absorber material or reflective material, and
wherein the absorber material is an EM absorber material that absorbs EM radiation, and the reflective material is an EM reflective material that reflects the EM radiation.

14. The system of claim 13, wherein the antenna is mounted on top of the structure.

15. The system of claim 13, wherein at least a portion of the structure surrounds at least a portion of the antenna.

16. The system of claim 13, wherein the core comprises a shape of one of a sphere, a hemisphere, at least a portion of a sphere, a pyramid, a cube, a cuboid, a cylinder, a cone, a polyhedron, a freeform shape, or a combination thereof.

17. The system of claim 13, wherein the absorber material comprises at least one of carbon, metal, metal particles, polypyrrole, or polyaniline.

18. The system of claim 13, wherein the absorber material comprises at least one of pyramidal absorber, tapered loading absorber, or impedance matching layer absorber.

19. The system of claim 13, wherein the vehicle is one of an airborne vehicle, a terrestrial vehicle, or a marine vehicle.

20. A system that reduces multipath and Rayleigh fading for an antenna, the system comprising:
the antenna to receive at least one desired electromagnetic (EM) signal transmitted from a source, wherein the antenna is mounted on a structure, and at least a portion of the structure surrounds at least a portion of the antenna;

a vehicle; and the structure, which is a shape of a three-dimensional (3D) geometrical shape and comprises a core covered by at least one of absorber material or reflective material, is mounted on the vehicle to at least one of absorb with the absorber material or to reflect with the reflective material at least one undesired EM signal transmitted, which is the multipath, from the source, and wherein the absorber material is an EM absorber material that absorbs EM radiation, and the reflective material is an EM reflective material that reflects the EM radiation.

\* \* \* \* \*